Figure 1:
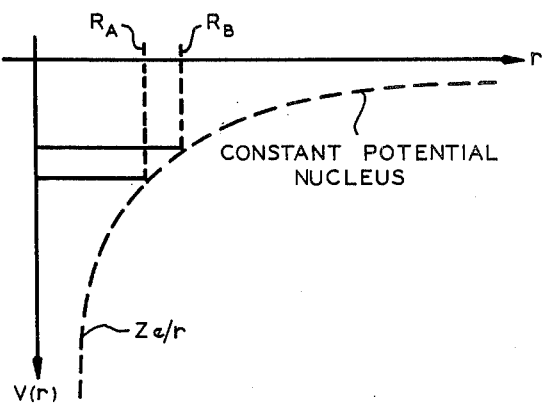

June 21, 1966  C. F. COOK ET AL  3,257,558
SELECTIVE MOSSBAUER DETECTOR AND USE THEREOF
Filed Oct. 5, 1962  5 Sheets-Sheet 1

INVENTORS
C.F. COOK
R.L. COLLINS
R.W. FINK
BY
Young & Quigg
ATTORNEYS

June 21, 1966 C. F. COOK ET AL 3,257,558
SELECTIVE MOSSBAUER DETECTOR AND USE THEREOF
Filed Oct. 5, 1962 5 Sheets-Sheet 2

INVENTORS
C.F. COOK
R.L. COLLINS
R.W. FINK

BY Young & Quigg
ATTORNEYS

INVENTORS
C. F. COOK
R. L. COLLINS
R. W. FINK

BY

*Young & Quigg*

ATTORNEYS

INVENTORS
C.F. COOK
R.L. COLLINS
R.W. FINK

BY *Young & Quigg*

ATTORNEYS

United States Patent Office 3,257,558
Patented June 21, 1966

3,257,558
SELECTIVE MOSSBAUER DETECTOR AND
USE THEREOF
Charles F. Cook and Russell L. Collins, Bartlesville, Okla., and Richard W. Fink, Milwaukee, Wis., assignors to Phillips Petroleum Company, a corporation of Delaware
Filed Oct. 5, 1962, Ser. No. 228,537
6 Claims. (Cl. 250—83.3)

This invention relates to method and apparatus for selectively detecting rediation. In one aspect the invention relates to method and apparatus for selectively detecting gamma rays. In another aspect the invention relates to method and apparatus for detecting gamma rays due to the Mossbauer effect. In a still further aspect the invention relates to method and apparatus for determining a property of a material by irradiating the material with gamma rays and detecting the absorption of gamma rays by the material due to the Mossbauer effect. In yet another aspect the invention relates to a selective Mossbauer spectrometer and method of operating thereof.

When a nucleus emits a gamma ray while undergoing an isomeric rearrangement, the gamma ray carries off momentum equal to $hv/c$. Here $h$ is Planck's constant, $v$ is the frequency of the gamma ray, and $c$ is the speed of light. The recoil energy imparted to a freely recoiling nucleus is $$R = \frac{h^2v^2}{2Mc^2} \quad (1)$$

where M is the nuclear mass. This energy is provided by the gamma ray, whose energy is correspondingly lowered. This means that, in general, the gamma ray has insufficient energy to re-create the type of excited nucleus from which it was born.

Rudolph Mossbauer's discovery consisted of the realization that, in a certain fraction $f$ of the emission events, the lattice recoiled as a whole rather than via an individual nucleus. The fraction $f$ is larger when the gamma ray energy $hv$ is small. The effective mass M of Equation 1 is here vastly greater, and the recoil energy is vanishingly small. The result is that these events, practically recoil-free, contain in the emitted gamma ray the entire energy of the nuclear transition. The breadth of the emitted spectrum is essentially limited only by the uncertainty principle, $$\delta E \delta T \geq h \quad (2)$$

where $\delta T$ is the lifetime and $\delta E$ is the energy spread.

The emission of these gamma rays of phenomenal spectral purity ($E/\delta E \cong 10^{12}$ for $Fe^{57}$) is readily detected. One reverses the process, using an absorber containing the nuclei of interest between the source and a gamma ray detector set to the range of interest. An extra absorption is present when the emitted gamma ray is of the correct energy to excite the nuclear isomeric transition. Because the emitted rays are extremely sharp, the gamma rays effective in reversing the process are correspondingly sharp. The shift in frequency needed to avoid this resonant absorption is very small (a part in $10^{12}$ for $Fe^{57}$). This is readily produced by moving the source relative to the absorber. A few millimeters per second Doppler shift is sufficient to destroy the resonance. This, then, forms the basis of detection. The extra absorption occurring at one or more Doppler velocities between source and absorber signals the presence of resonant absorption of recoil-free gamma rays.

The Coulomb field at the nucleus affects the energy of the nuclear isomeric transition, since the excited nucleus and the ground state nucleus differ in size. This Coulomb field is determined almost entirely by the "s" character of the electronic wave function at the nucleus, and this varies considerably with valence and chemical bonding. The effect on the spectrum is an energy shift, relative to the source, termed the "chemical" shift.

Another effect leads to a splitting of this chemically shifted line into two lines. This is the quadrupole effect, and exists when either the ground or excited nucleus has a quadrupole moment and the environment in the lattice leads to a non-vanishing electric field gradient at the nucleus.

A second kind of splitting is caused by the hyperfine interaction between the nuclear spin and magnetic fields. The effect is prominent for ferro-magnetic and antiferromagnetic materials which exhibit internal fields approaching a million gauss.

Mossbauer spectroscopy is applicable to an extremely broad spectrum of problems in physics and chemistry. One of the advantages of Mossbauer spectroscopy stems from the extreme narrowness of the line, which is attainably several orders of magnitude purer than even atomic beam oscillators and masers. The problem of making a Mossbauer transition turn the hands of a clock has not yet been solved, but it has been used to measure the relativistic gravitational effect on clocks (a precision of 1 in $10^{15}$). Mossbauer spectroscopy can be utilized to determine chemical binding of metals and the Mossbauer effect will give information unobtainable by current methods. Mossbauer spectroscopy is also particularly suited for studying lattice dynamics as information is readily obtained by determining the change in $f$ with temperature and environment. Time-filtered Mossbauer spectra permits one to follow the very first chemical rearrangements following formation of the excited state nucleus.

It is important to note the effect of $f$ (the fraction of events occurring without recoil) on the quality of the spectra. With current scintillation detectors, no distinction is made between Mossbauer photons and non-Mossbauer photons of the same nominal energy. A decrease in $f$ thus both decreases the extent of resonance absorption and also raises the background. For N counts in a channel, the 50 percent probable error is $\sqrt{N}$, so that the relative (percent) noise level becomes $100/\sqrt{N}$. Low $f$ values require a quadratic time increase for comparable signal/noise. Accordingly it has become desirable to provide a novel apparatus for selectively detecting the Mossbauer photons.

In accordance with the present invention it has been discovered that Mossbauer photons can be selectively detected by an apparatus comprising a vacuum container; an anode, a cathode, and a plurality of dynodes mounted in said vacuum container; said cathode comprising a Mossbauer nucleus material.

Still further in accordance with the invention it has been discovered that Mossbauer spectroscopy can be substantially improved through the utilization of such a selective Mossbauer detector.

Accordingly it is an object of the invention to provide a novel radiation detector. Another object of the invention is to provide method and apparatus for selectively detecting gamma rays. A still further object of the invention is to provide novel method and apparatus for selectively detecting gamma rays due to the Mossbauer effect. Yet another object of the invention is to provide method and apparatus for determining a property of a material. A still further object of the invention is to provide a novel spectrometer.

Other aspects, objects and advantages of the invention will be apparent from the study of the disclosure, the drawing and the appended claims to the invention.

Figure 2:
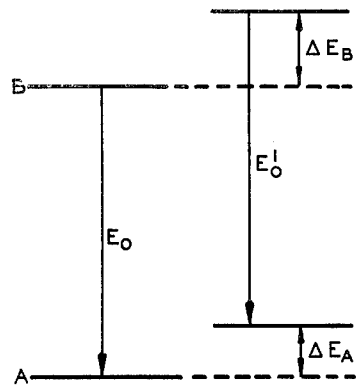
Figure 3:
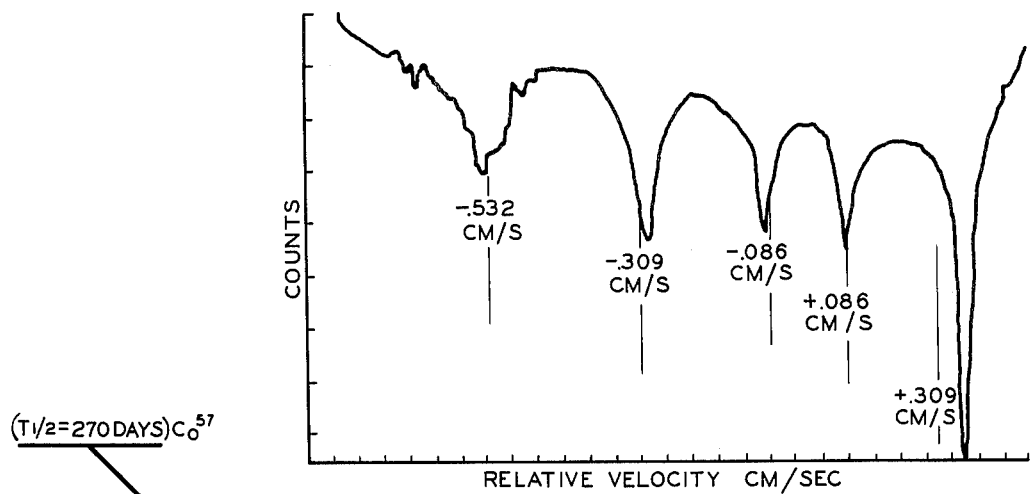
Figure 4:
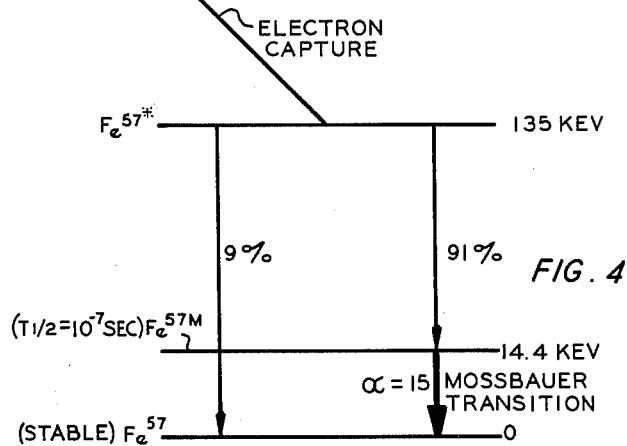
Figure 5:
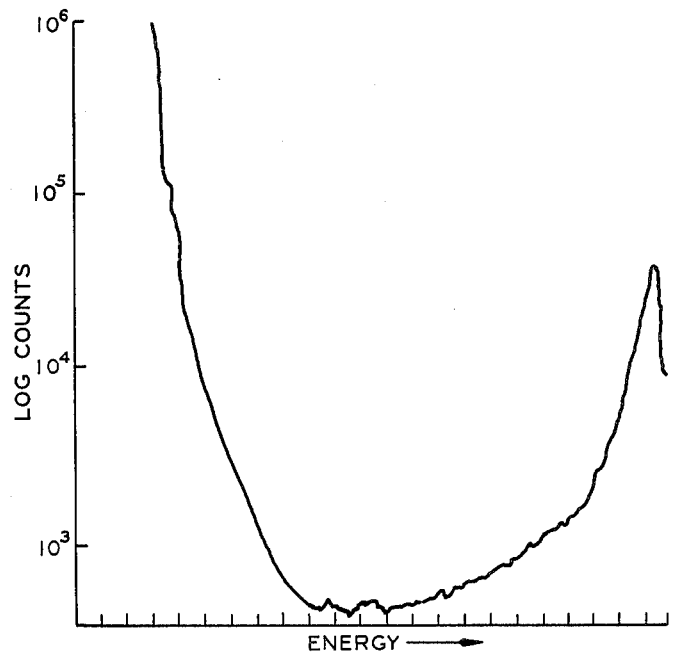
Figure 7:
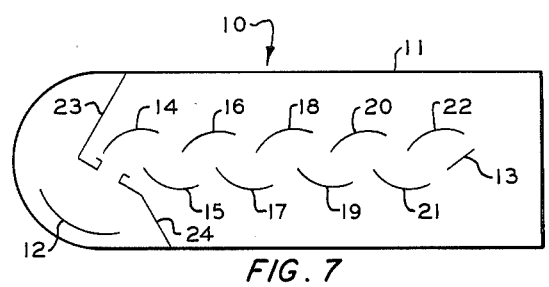
Figure 6:
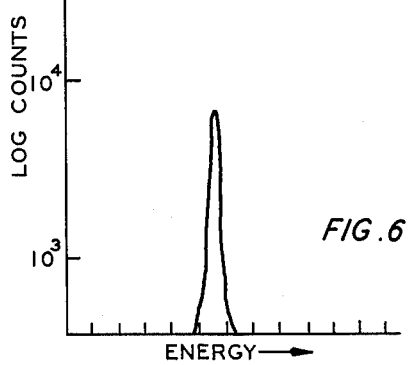
Figure 8:
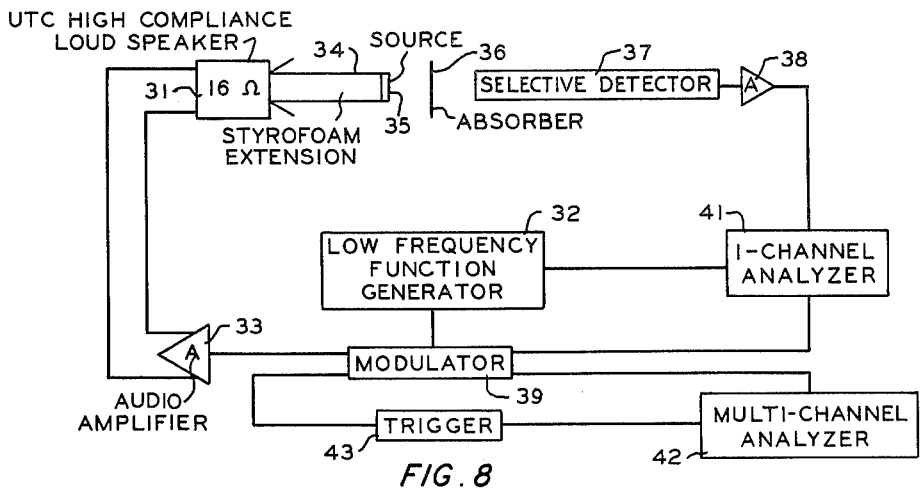
Figure 9:
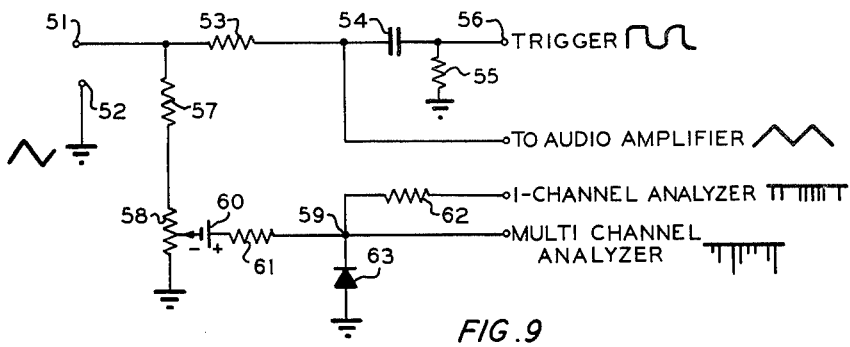
Figure 10:
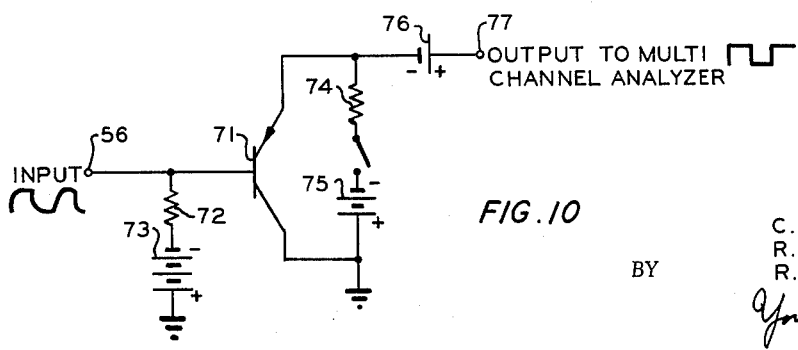
Figure 11:
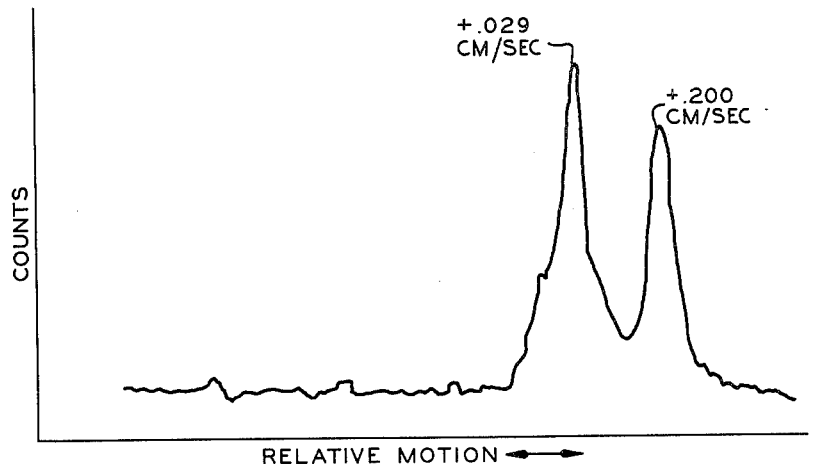
Figure 12:
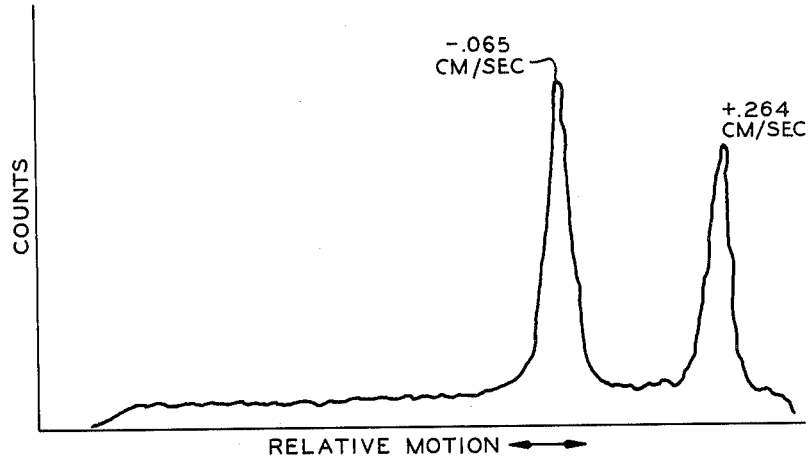
Figure 14:
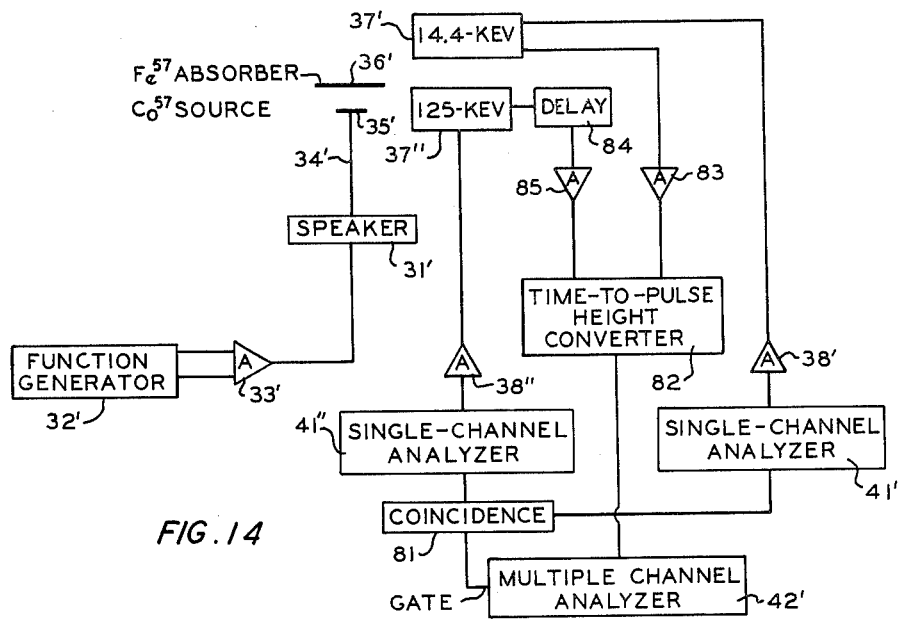
Figure 13:
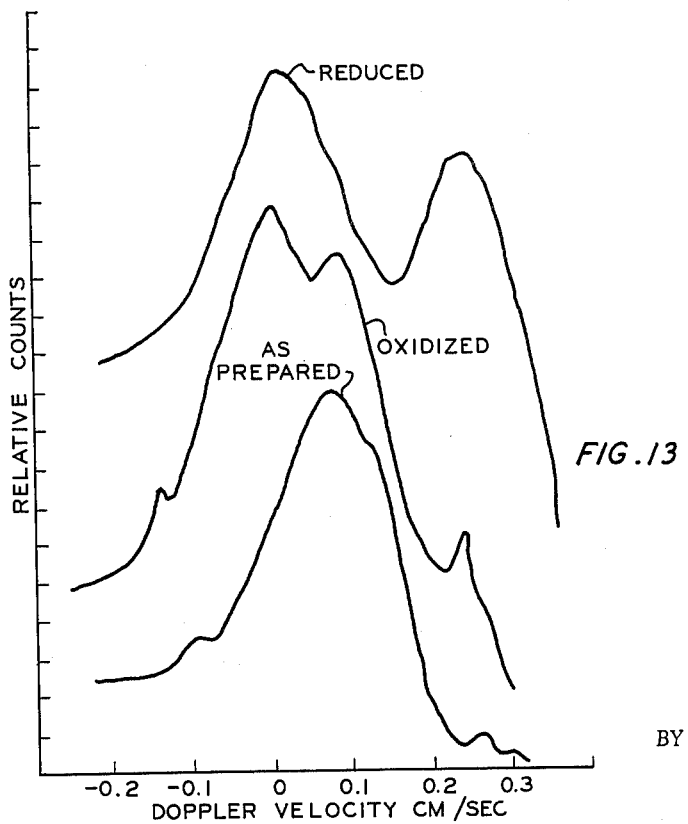

In the drawings FIGURES 1 and 2 are graphic illustrations relating to the basis of the "chemical" shift; FIGURE 3 is a graphic representation of the hyperfine spectrum of iron; FIGURE 4 is a graphic representation of the decay scheme of $Co^{57}$; FIGURES 5 and 6 are graphic representations of the spectrum of gamma rays emitted by $Co^{57}$ as measured by a scintillation detector and by a selective detector in accordance with the invention, respectively; FIGURE 7 is a schematic representation of a selective detector in accordance with the invention; FIGURE 8 is a schematic representation of a Mossbauer spectrometer utilizing a selective detector in accordance with the invention; FIGURES 9 and 10 are schematic diagrams of the modulator and trigger respectively, of FIGURE 8; FIGURES 11 and 12 are graphic representations of typical Mossbauer spectra detected by the spectrometer of FIGURE 8; FIGURE 13 is a graphic representation of the change in spectra for a catalyst when oxidized and reduced; and FIGURE 14 is a schematic representation of a time resolved Mossbauer spectrometer.

A Mossbauer nucleus (the absorber nuclide) must possess an isomeric nuclear state only 5–200 kev. above the ground state. A large number of the more complex elements possess at least one isotope satisfying this requirement. The lifetime should also be reasonably long (greater than $10^{-11}$ seconds). Examples of Mossbauer nuclei are set forth in Table I where $E\gamma$ is the energy level of the emitted Mossbauer gamma rays and powers of 10 are denoted as $1.0(-7) = 1.0 \times 10^{-7}$.

TABLE I

| Stable Nuclide | $E\gamma$, kev. | Half-life, seconds |
|---|---|---|
| $Fe^{57}$ | 14.4 | 1.0(−7) |
| $Ni^{61}$ | 71 | 5.2(−9) |
| $Zn^{67}$ | 93 | 9.4(−6) |
| $Ge^{73}$ | 13.5 | 3.1(−6) |
| $Kr^{83}$ | 9.3 | <1(−7) |
| $Ru^{99}$ | 89 | |
| $Ru^{101}$ | 127 | 1.4(−9) |
| $Ag^{107}$ | 93 | 44.3 |
| $Ag^{109}$ | 88 | 39.2 |
| $Sn^{117}$ | 161 | |
| $Sn^{119}$ | 24 | 1.9(−8) |
| $Sb^{123}$ | 161 | |
| $Te^{123}$ | 159 | 1.9(−10) |
| $Te^{125}$ | 35 | 1.6(−9) |
| $I^{127}$ | 59 | |
| $Xe^{129}$ | 40 | |
| $Xe^{131}$ | 80 | 4.8(−10) |
| $Cs^{133}$ | 81 | 6.0(−9) |
| $La^{139}$ | 163 | 1.5(−9) |
| $Nd^{145}$ | 67 | 3.3(−8) |
| | 72 | <1(−9) |
| $Sm^{152}$ | 122 | 1.4(−9) |
| $Eu^{151}$ | 22 | |
| $Eu^{153}$ | 84 | |
| | 97 | <1(−9) |
| | 103 | 3.4(−9) |
| $Gd^{154}$ | 123 | 1.2(−9) |
| $Gd^{155}$ | 60 | |
| | 87 | |
| | 105 | |
| $Gd^{156}$ | 89 | 2(−9) |
| $Gd^{160}$ | 75 | |
| $Tb^{159}$ | 58 | 3.5(−11) |
| | 137 | 5.4(−11) |
| $Dy^{160}$ | 87 | 1.8(−9) |
| $Dy^{161}$ | 25.7 | 2.8(−8) |
| | 74.5 | 3(−9) |
| $Dy^{162}$ | 81 | 3.2(−9) |
| $Dy^{163}$ | 75 | |
| $Dy^{164}$ | 73 | 3.5(−9) |
| $Ho^{165}$ | 95 | 3.3(−11) |
| $Er^{164}$ | 91 | 1.4(−9) |
| $Er^{166}$ | 80 | 1.8(−9) |
| $Er^{168}$ | 79.8 | 1.84(−9) |
| $Tm^{169}$ | 8.4 | 4(−9) |
| | 118 | 5(−11) |
| $Yb^{170}$ | 84.2 | 1.57(−9) |
| $Yb^{171}$ | 66.7 | <5(−7) |
| $Yb^{172}$ | 78.7 | |
| $Yb^{173}$ | 78.7 | |
| $Yb^{174}$ | 76.5 | |
| $Lu^{175}$ | 113.8 | 8(−11) |
| $Hf^{176}$ | 88.3 | 1.35(−9) |
| $Hf^{177}$ | 113 | 4.2(−10) |
| $Hf^{178}$ | 93.1 | 1(−9) |
| $Hf^{180}$ | 93 | 1.4(−9) |
| $Ta^{181}$ | 6.25 | 6.8(−6) |
| | 136.1 | 5.7(−11) |
| $W^{180}$ | 102 | |
| $W^{182}$ | 100 | 1.3(−9) |
| $W^{183}$ | 46.5 | |
| | 99.1 | |

TABLE I

| Stable Nuclide | $E\gamma$, kev. | Half-life, seconds |
|---|---|---|
| $W^{184}$ | 111 | 1.3(−9) |
| $W^{186}$ | 123 | 1.0(−9) |
| $Re^{185}$ | 125 | |
| $Re^{187}$ | 134 | 2(−9) |
| $Os^{186}$ | 137 | 5.1(−10) |
| $Os^{188}$ | 155 | 6.2(−10) |
| $Os^{190}$ | 187 | 3.5(−10) |
| $Os^{192}$ | 206 | 2.8(−10) |
| $Ir^{191}$ | 82.6 | 3.9(−9) |
| | 129 | 1.4(−10) |
| $Ir^{193}$ | 73 | 5.7(−9) |
| | 139 | 2.6(−10) |
| $Pt^{195}$ | 99 | |
| | 129 | 5.8(−10) |
| $Au^{197}$ | 77 | 1.9(−9) |
| $Hg^{199}$ | 158 | 2.4(−9) |
| $Hg^{201}$ | 32.1 | |
| | 167.6 | |

The nuclides listed in the previous table refer to the absorber. An emitter is of course needed to observe the resonant absorption. These are readily determined by reference to a table of radio-isotopes. For example, the parent of $Fe^{57}$ is $Co^{57}$.

The shift in frequency due to the "chemical shift" depends upon differences in electron distribution about the emitter and absorber nuclei. This energy shift occurs because of the change in nuclear radius from the excited to the ground state. A similar effect has been known for some time in optical spectroscopy, where isotopes of an element have different nuclear radii and so cause an energy shift in optical transitions. This shift is referred to as "isomer" shift by optical spectroscopists, and there is a move about to give the Mossbauer phenomenon the same tag.

In order to calculate the shift of the nuclear energy levels, consider first a point nucleus, of charge $Ze$, with two levels A and B separated by an energy $E_0$. The electrostatic potential created by this point nucleus is shown as a dotted line in FIGURE 1. Now consider another nucleus, of equal charge, but with radius $R_A$ in the ground state A and a radius $R_B$ in the excited state B. Because of the diminished interaction with the electrons, the two levels A and B will lie higher for this nucleus than they did for the point nucleus, as illustrated in FIGURE 2. In other words, energy is gained by permitting electrons to enter the nuclear volume.

To find the shift $\Delta E_A$, one determines the contribution to the total energy of the system which comes from the electrostatic interaction. The potential from $R_A$ to infinity is the same for the finite as for the point nucleus. Hence only the volume from 0 to $R_A$ need be taken into account when determining the energy shift. If one assumes that the wave function $\psi(r)$ of the relevant electrons is essentially constant over the distances involved and can be replaced by $\psi(0)$, the contribution to the interaction energy from the volume is given by $$E(R_A) = -\int_0^{R_A} V(r) e |\psi(0)|^2 4\pi r^2 dr \quad (3)$$

where $V(r)$ is the electrostatic potential created by the nucleus. If the nucleus were a point nucleus, $V(r) = Ze/r$, one finds $$E_p(R_A) = -2\pi Z e^2 R_A^2 |\psi(0)|^2 \quad (4)$$

The energy $E(R_A)$ for a finite nucleus depends upon the charge distribution. Easiest to calculate is the surface charge model (top slice model), where the electrostatic potential is constant from the center to the nuclear surface and joins the outside potential at $r=R$. This potential is shown in FIGURE 2 and its contribution is given by $$E_s(R_A) = -\tfrac{4}{3}\pi Z e^2 R_A^2 |\psi(0)|^2 \quad (5)$$

The difference between Expressions 5 and 4 yields the shift $$\Delta E_A^s = E_s(R_A) - E_p(R_A) = \tfrac{2}{3}\pi Z e^2 R_A^2 |\psi(0)|^2 \quad (6)$$

The assumption of a surface charge is unrealistic, but the calculation can easily be performed with a uniform nuclear charge density $\rho$. The result has the same form as Expression 6, but the nuclear radius $R_A^2$ is replaced by the root-mean-square radius.

$$<R_A^2> = \int \rho r^2 dv \qquad (7)$$

The transition energy between two levels B and A becomes $$E_o' = E_o + \Delta E_B - \Delta E_A = E_o + \tfrac{2}{3}\pi Z e^2 |\psi(0)|^2 [<R_A^2> - <R_B^2>] \qquad (8)$$

It is ordinarily impossible to observe such a small energy change. However, if one performs a Mossbauer experiment and uses source and absorber with different chemical environments such that the wave functions at the nuclei in the emitter $e$ and the absorber $a$ are different, one finds for the difference in gamma ray energy (from Expression 8)

$$\delta = E_a - E_e = 2/3\pi Z e^2 [<R_B^2> - <R_A^2>] \{|\psi(0)_A|^2 - |\psi(0)_e|^2\} \qquad (9)$$

The chemical shift thus offers the possibility of measuring changes in electron concentration at the nucleus, $|\psi(0)|^2$.

The energy levels of either the excited or ground state nuclei may be affected by an electric field gradient if the spin exceeds ½. The energy shift is $$\epsilon = \frac{e^2 q Q}{4I(2I-1)}[3m^2 - I(I+1)] \qquad (10)$$

where $q$ denotes $(1/e)(\partial^2 V/\partial Z^2)$. Q is the quadrupole moment, I the total spin, and $m$ the spin substate. $Fe^{57}$ has spin ½ and is hence unaffected by electric field gradients. $Fe^{57m}$ has spin 3/2, and an appreciable quadrupole splitting has been observed for $Fe_2O_3$. Since the quadrupole moment of $Fe^{57m}$ is constant, the splitting observed in the Mossbauer spectra clearly reveals the relative electric field gradients present and the extent to which they vary from nucleus to nucleus.

For nuclei with non-zero spin, the application of a magnetic field H splits the state into $2I+1$ components. The energy spacing is $$\Delta = g\mu_o H \qquad (11)$$

where $\mu_o$ is the nuclear magneton, $5.05 \times 10^{-24}$ erg/gauss, and $g$ is a number characteristic of the nucleus. This is precisely the sort of splitting which leads to nuclear magnetic resonance. A fairly large field is needed to clearly resolve these components in the Mossbauer effect. Such fields often occur internally, such as in ferromagnets like Fe metal ($0.3 \times 10^6$ gauss) or antiferromagnets like $Fe_2O_3$ ($0.5 \times 10^6$ gauss). The hyperfine splitting for iron is illustrated in FIGURE 3.

The effect of increased temperature is increased velocity of nuclei in a lattice. The linear Doppler shift of these velocities, $(v/c)\cos^a$, averages to zero because the lattice motions are fast compared with the lifetime of the excited state. A second-order Doppler term does not cancel, however. When the excited state decays by gamma ray emission, the nucleus loses energy, and its mass is reduced by an amount $\delta M = -E/c^2$. Its thermal momentum $p$ is unchanged, since the lattice takes up all the recoil momentum. The reduced mass, however, causes an increase in the kinetic energy of the atom.

$$\delta E_{kin} = \frac{\partial E_{kin}}{\partial M}\delta M = \left(\frac{-p^2}{2M^2}\right)\left(-\frac{E}{c^2}\right) = \tfrac{1}{2}\frac{EV^2}{c^2} \qquad (12)$$

and this is compensated by a corresponding decrease in the energy of the emitted gamma ray. Conversion of this expression into one involving temperature yields, per degree, $$\delta E/E = C_p/2c^2 \cong 2.2 \times 10^{-15}/^\circ K. \qquad (13)$$

This can be readily measured with $Fe^{57}$ and must be corrected for or avoided. The natural line width of $Fe^{57}$ has $\delta E/E = 3 \times 10^{-13}$.

For purposes of illustration the Mossbauer effect will now be described with reference to a system utilizing $Fe^{57}$ as the Mossbauer nucleus. A suitable $Co^{57}$ can be prepared by electrolytic deposition from $Co^{57}Cl_2$ onto a metal such as stainless steel. Annealing in hydrogen for several hours at 1100° C. diffuses the $Co^{57}$ activity into the lattice an estimated $10^{-5}$ cm. The decay scheme is shown in FIGURE 4. $Co^{57}$ has an internal conversion coefficient of 15 which means that only one 14.4 kev. gamma ray in sixteen escapes the atom without interaction with the atomic electrons. These interactions lead to ejection of electrons and Fe X-rays of energy less than 14.4 kev. The source emits gamma rays of 135 kev., 121 kev., and 14.4 kev., as well as 8 kev. and lower energy Fe X-rays. The spectrum observed with a 0.5 mm. NaI (T1) scintillation detector when a thin sheet of $Fe^{57}$ is placed between the source and detector is shown in FIGURE 5. The spectrum observed with a selective radiation detector having a $Fe^{57}$ cathode in accordance with the present invention when the same sheet of $Fe^{57}$ is placed between the source and detector is shown in FIGURE 6. Thus it is readily seen that the selective radiation detector of the present invention is responsive substantially only to the gamma rays corresponding to the Mossbauer effect.

Referring now to FIGURE 7, there is illustrated a selective gamma radiation detector 10 comprising a vacuum-tight container 11, a cathode 12, an anode 13, a plurality of dynodes 14–22, and shields 23 and 24. For purposes of simplicity the electrode supporting members have been omitted as suitable support means would be obvious to one skilled in the art. Container 11 can be formed of any suitable material, such as glass, beryllium, or aluminum. Where the cathode 12 is photosensitive, it is desirable that container 11 be formed of a material, for example beryllium or glass which has been painted, which is opaque to visible light, ultra-violet radiation and infrared radiation, at least in the ranges thereof to which the cathode material is photosensitive. If desired container 11 can be formed of a suitable gamma ray shielding material, for example lead or lead coated glass, except for a gamma ray window adjacent cathode 12. If the amount of background electrons is higher than desirable, detector 10 can be provided with any suitable means for excluding or reducing the admission of the electrons while permitting the admission of gamma rays, such as means (not shown) for establishing an electric field or a magnetic field for deflecting the background electrons away from detector 10. If desired detector 10 can be provided with suitable means for shielding the internal elements thereof from the electric or magnetic field utilized to exclude the external background electrons. Cathode 12 comprises the Mossbauer nucleus of interest and can be in the form of a thin sheet or film and can be attached directly to the inside of container 11 or supported therefrom. Cathode 12 can be placed in any position in container 11 wherein the gamma rays will strike the cathode and the emitted electrons will be directed toward the first dynode. Cathode 12 can be formed entirely of the Mossbauer nucleus of interest or be supported on or be a composite with a non-Mossbauer nucleus and/or a Mossbauer nucleus whose absorption range is outside of the range of interest. Thus for example $Fe^{57}$ can be supported on a sheet of beryllium. The cathode is preferably "enriched" in the Mossbauer nucleus. Thus for iron which has an abundance of the stable element $Fe^{57}$ of only 2.17 percent, the cathode is preferably enriched to a higher value, for example 82 percent. This provides a greater degree of Mossbauer absorption per unit of cross-sectional area.

Cathode 12, dynodes 14 to 22 and anode 13 are positioned in such a manner that the electrons emitted by cathode 12 will be electrostatically drawn from cathode 12 to the first dynode 14 and the electrons emitted by each dynode are attracted to the next succeeding dynode with the electrons emitted by dynode 22 being attracted to anode 13. Each of the dynodes as well as anode 13 can be maintained at a relative successively higher positive potential with respect to the preceding dynode. Thus the number of electrons emitted by cathode 12 is amplified by the secondary emission of dynodes 14–22 which can be of any suitable secondary emitting material known in the art. Similarly anode 13 can be of any suitable material known in the art. Shields 23 and 24 can be provided to focus the electrons emitted by cathode 12 onto dynode 14. While the structure of the selective detector illustrated in FIGURE 7 is presently preferred, any suitable means can be provided for amplifying the electrons produced by cathode 12.

Several methods have been devised for observing the Mossbauer effect. The simplest method may be termed a "spoiler" experiment. The number of counts per unit time is compared with the source stationary and with the source vibrated. Provided there is appreciable absorption without vibration (e.g., no appreciable frequency difference between source and absorber), it is easy to vibrate the source with adequate velocities to avoid resonant absorption most of the time. For example, consider the 14 kev. gamma ray from $Co^{57}$ in stainless steel. One-half mil stainless steel attenuates this about 50 percent. The transmission rises to about 56 percent when the source is vibrated at several centimeters per second.

A method better suited to obtaining detailed spectra is shown in FIGURE 8. A loudspeaker 31 serves as velocity drive, and a uniform time distribution of the velocity is achieved approximately by driving with a triangular waveform produced by low frequency function generator 32 and amplified by audio amplifier 33. The loudspeaker 31 is acoustically loaded very lightly by the styrofoam extension 34 and source 35—the cone can be removed to avoid acoustic pick-up. As a result, the velocity very nearly matches the applied voltage. That is, the voice coil moves at just the velocity needed to develop a back E.M.F. equal to the drive voltage, less a little for dissipative losses. This feature allows one to readily detect friction due to voice coil misalignment. The A.C. voltage at the speaker terminal is very near the voltage output of amplifier 33. The effective impedance of the speaker 31 is several thousand ohms when friction-free. An A.C. voltmeter can be utilized to monitor the voltage at the speaker terminals which begins to decline upon the onset of friction.

The Mossbauer gamma rays produced by source 35 are transmitted or absorbed by absorber 36 which is the sample of interest. When the Mossbauer gamma rays are not absorbed by absorber 36 they are detected by the selective detector 37. Detector 37 is preferably similar to selective detector 10 set forth in FIGURE 7. The output of detector 37 is amplified in amplifier 38 and passed to modulator 39. If desired a single channel analyzer 41, which passes only pulses of the right size, can be utilized to check detector 37 for drift for other errors due to extraneous factors. The modulator 39 tags each of the pulses with an amplitude according to the instantaneous velocity of the source 35 at that time. These modulated pulses enter the multi-channel analyzer 42, which sorts the pulses by amplitude into several hundred individual channels. The capacity of each of the channels is one million for a Nuclear Data multi-channel analyzer.

Where there are difficulties associated with combining the to-and-fro motions of the loudspeaker 31 due to non-reproducibility of the forward motion by the backward motion, half of the information can be discarded to avoid this problem. The coincidence circuit of the analyzer 42 is blank every half cycle due to the action of the trigger circuit 43. Where, however, this problem is not encountered, or can be overcome by other methods, the entire output of analyzer 41 can be utilized. Analyzers 41 and 42 can be any suitable devices, for example Baird Atomic model 510 and Nuclear Data Inc. model ND 130, respectively. Generator 32 can also be any suitable device, for example a Hewlett-Packard model 202A.

Referring now to FIGURE 9, the triangular waveform output of generator 32 is applied to modular 39 between terminals 51 and 52, the latter being connected to ground. The triangular signal is passed by way of resistor 53 and terminal 54 to amplifier 33; the triangular signal is reshaped by the network comprising capacitor 54 and resistor 55 and passed by way of terminal 56 to trigger 43. Resistor 57 and potentiometer 58 are connected in series between terminal 51 and ground with the contactor of potentiometer being connected to junction 59 by way of battery 60 and resistor 61. The output of analyzer 41 is connected to junction 59 by way of resistor 62, and junction 59 is connected to ground by way of diode 63. Junction 59 is connected to the input of multiple channel analyzer 42. Modulator 39 serves to identify each of the pulses passed by analyzer 41, all of which have substantially the same pulse height, by changing the amplitude thereof to correspond to a function of the time during the cycle and thus the relative motion between source 35 and detector 37.

Referring now to FIGURE 10 terminal 56 is connected directly to the base of transistor 71 and ground by way of resistor 72 and battery 73. The collector of transistor 71 is connected to ground while the emitter is connected to ground by way of resistor 74 and battery 75. The emitter is also connected through battery 76 and terminal 77 to an input of the coincidence circuit of multiple channel analyzer 42. Thus trigger 43 operates to block the input to analyzer 42 during alternate half cycles.

Typical Mossbauer spectra are shown in FIGURES 11 and 12. The sample corresponding to FIGURE 11 is bulk $Fe_2(NH_4)_2(SO_4)_2 \cdot 6H_2O$ at 94° F. The sample corresponding to FIGURE 12 is bulk $FeSO_4 \cdot 7H_2O$ at 94° F.

Mossbauer spectra can be utilized to yield information on catalysts. For example, Fe exhibits rather different chemical shifts and quadrupole splittings in bulk salts depending on valence and crystal habit. Supported Fe salts on a variety of gel-type catalysts reflect differences in electronic distribution about the Fe nucleus. The changes in electron distribution about metal nuclei supported on catalytic substrates is of considerable help in resolving the chemical influence of substrates.

If Fe were a useful component of a catalyst of interest, one would like to obtain Mossbauer spectra before and after activation and also under reaction conditions. The discrete spectrum is helpful here, in contrast to measurements which perform an average such as magnetic susceptibility, since different electronic distribution show up separately.

Differences in valence of iron supported on silica-alumina were produced by oxidation and by hydrogen reduction at 500° C. Iron–57 enriched to 50 percent instead of its natural 2.2 percent abundance was necessary to achieve good signal/noise ratios in exposure of a few hours. The spectra are shown in FIGURE 13. Two important conclusions can be drawn from this preliminary data: (1) a Mossbauer effect does exist for metals supported on these relatively flimsy gels, and (2) prominent differences in the spectra occur upon effecting chemical changes.

In discussion so far, all Mossbauer photons have been accepted as equals, irrespective of the lifetime of the excited state. It is possible to sort out the detected Mossbauer gammas according to the time they existed in the excited state. The basis, for example, in $Fe^{57}$ is the time interval between detection of a 121 kev. gamma ray (signifying the creation of $Fe^{57m}$) and detection of the 14.4 kev. gamma ray (signifying its demise). The resolving time of the apparatus should be appreciably smaller than the half-life, which is $10^{-7}$ seconds for $Fe^{57m}$. There exist circuits for achieving resolution better than $10^{-9}$ seconds.

A diagram of a spectrometer capable of time-filtering is shown in FIGURE 14. The set-up is largely self-explanatory. Delayed coincidences between 121 kev. and 14.4 kev. gamma rays are sought. Primed numerals designate elements similar to elements of FIGURE 8 having the corresponding numerals. The source 35' is moved with respect to absorber sample 36' and detectors 37' and 37" by means of speaker 31' which is driven by the output of function generator 32' which has been amplified in amplifier 33'. The 14.4 kev. gamma rays are selectively detected by detector 37', the output of which is amplified in amplifier 38' and passed through single-channel analyzer 41' to an input of coincidence circuit 81. Similarly the 121 kev. gamma rays are selectively detected by detector 37", the output of which is passed through amplifier 38" and single-channel analyzer 41" to a second input of coincidence circuit 81. The output of coincidence circuit 81 gates the passage of the output signal of time-to-pulse height converter 82 into multiple channel analyzer 42'. The output of detector 37' is passed through amplifier 83 to one input of converter 82 while the output of detector 37" is passed through delay 84 and amplifier 85 to a second input of converter 82. Normally, the 121 kev. gamma ray starts the time-to-pulse-height converter and the 14.4 kev. gamma ray terminates it. A pulse proportional to the time interval is generated and, if it passes certain tests, is analyzed by a multichannel analyzer.

Consider the events which occur about a Mossbauer parent nucleus when it decays. In $Co^{57}$, electron capture takes place and the nucleus very promptly emits a 121 kev. gamma ray. Several events begin to occur at this point:

(1) The nucleus recoils and generates a heat spike.

(2) A shower of electrons begins to fill the vacancy in the K-shell resulting from electron capture, and to fill the vacancies created by an L electron dropping into the K shell, etc. The X-rays emitted thereby eject outer electrons (Auger electrons) and re-start the process at lower energy levels. In consequence, 10–20 electrons may be shaken loose from the nucleus and a very positive ion produced. Electrons then drift into the positive ion and produce additional X-rays.

(3) The 121 kev. gamma ray may internally convert, e.g., dislodge an electron, and the sequence (2) is re-started.

(4) After a while ($10^{-7}$ sec. half-life), the 14.4 kev. gamma is emitted. The Mossbauer effect is not concerned with the $15/16$ of these which internally convert, but only with the $1/16$ which escape.

The nature of the emitted Mossbauer spectrum depends greatly on the nuclear environment at the time of emission. If, for example, emission occurs while the Auger electrons are still away from the nucleus, a considerable chemical shift will prevail. An interesting variant exists for compounds such as $Co^{57}$ for which there are compounds existing stably that are not shown for $Fe^{57}$. Hence it is possible to follow the dissolution of a chemical binding situation by time-filtered Mossbauer spectra.

While the invention has been described utilizing speaker 31 as the means for moving source 35, it is within the contemplation of the invention to utilize any suitable means, for example an electric motor having suitable cams associated therewith, for effecting relative motion between any two of the source, the absorber sample, and the detector. Thus the source can be held stationary and the detector can be moved, or both the source and detector can be held stationary and the absorber can be moved.

Reasonable variation and modification are possible within the scope of the foregoing disclosure, the drawings and the appended claims to the invention.

We claim:

1. A Mossbauer spectrometer comprising a source of Mossbauer gamma rays; a selective radiation detector; means for subjecting a sample of the material to be investigated to the radiation from said source; said detector being positioned with respect to said sample so as to be subjected to the radiation from said source which is transmitted by said sample; means for causing relative motion between two of said source, said sample and said detector; said detector comprising a housing enclosing an anode, a cathode and an electron multiplier; said cathode being a single layer formed of a Mossbauer nucleus having a Mossbauer excitation level corresponding to the Mossbauer gamma rays emitted by said source; and means for correlating each of the outputs of said detector with the corresponding degree of relative motion produced by said means for causing.

2. Apparatus in accordance with claim 1 wherein said Mossbauer nucleus is selected from the group set forth in Table I of the specification.

3. Apparatus in accordance with claim 1 wherein said Mossbauer nucleus is $Fe^{57}$.

4. Apparatus in accordance with claim 1 wherein said detector comprises a vacuum-tight housing; an anode, a cathode and a plurality of dynodes positioned within said housing; said cathode being a single layer formed of a Mossbauer nucleus which emits electrons substantially only in response to Mossbauer gamma rays.

5. Apparatus in accordance with claim 1 wherein said housing is opaque to visible light, ultraviolet radiation and infrared radiation.

6. Apparatus in accordance with claim 1 wherein said cathode consists essentially of a Mossbauer nucleus which emits electrons substantially only in response to the Mossbauer gamma rays from said source.

References Cited by the Examiner

UNITED STATES PATENTS 2,994,773  4/1961  Sternglass _____ 250—83.3

OTHER REFERENCES

Pound et al., Apparent Weight of Photons, Physical Review Letters, vol. 4, No. 7, April 1, 1960, pages 337 to 341.

RALPH G. NILSON, *Primary Examiner.*

JAMES W. LAWRENCE, *Examiner.*